United States Patent
Wang

(10) Patent No.: US 12,556,454 B2
(45) Date of Patent: Feb. 17, 2026

(54) AI AUTOSCALING CONTAINERS IN A CLOUD-NATIVE CORE NETWORK WITH CONTAINERISED NETWORK FUNCTIONS

(71) Applicant: Samsung Electronics Co., Ltd., Suwon-si (KR)

(72) Inventor: Yue Wang, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 432 days.

(21) Appl. No.: 18/042,288

(22) PCT Filed: Aug. 23, 2021

(86) PCT No.: PCT/KR2021/011207
§ 371 (c)(1),
(2) Date: Feb. 20, 2023

(87) PCT Pub. No.: WO2022/045700
PCT Pub. Date: Mar. 3, 2022

(65) Prior Publication Data
US 2023/0325258 A1    Oct. 12, 2023

(30) Foreign Application Priority Data

Aug. 26, 2020  (GB) ..................... 2013324

(51) Int. Cl.
*G06F 9/46*  (2006.01)
*G06F 9/50*  (2006.01)
(Continued)

(52) U.S. Cl.
CPC ........ *H04L 41/0897* (2022.05); *G06F 9/5016* (2013.01); *G06F 9/5072* (2013.01);
(Continued)

(58) Field of Classification Search
None
See application file for complete search history.

(56) References Cited

U.S. PATENT DOCUMENTS

| 8,185,909 B2 | 5/2012 | Sigal et al. |
| 9,112,782 B2 | 8/2015 | Siddiqui et al. |

(Continued)

FOREIGN PATENT DOCUMENTS

EP     3410301 A1    12/2018

OTHER PUBLICATIONS

Imdoukh et al; Machine learning-based auto-scaling for containerized applications, Springer-Verlag London Ltd., 2019 (Year: 2019).*
(Continued)

*Primary Examiner* — Bing Zhao

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method performed by an artificial intelligence (AI) module for autoscaling containers of a cloud-native core network with containerised network functions is provided. The method comprising requesting, from at least one metrics server, at least one metric required to make an autoscaling decision with respect to at least one set of containers; receiving the at least one metric from the at least one metrics server; processing the received at least one metric, using a trained machine learning (ML) model, to make an autoscaling decision with respect to the set of (Continued)

containers; and implementing the autoscaling decision with respect to the set of containers.

15 Claims, 13 Drawing Sheets

(51) Int. Cl.
*H04L 41/0897* (2022.01)
*H04L 41/16* (2022.01)

(52) U.S. Cl.
CPC ............ *G06F 9/5083* (2013.01); *H04L 41/16* (2013.01); *G06F 2209/501* (2013.01)

(56) References Cited

U.S. PATENT DOCUMENTS

| | | | |
|---|---|---|---|
| 9,462,427 B2 | 10/2016 | Patel et al. | |
| 11,010,205 B2 | 5/2021 | Sharma et al. | |
| 2010/0220622 A1 | 9/2010 | Wei | |
| 2017/0126792 A1 | 5/2017 | Halpern et al. | |
| 2017/0353361 A1* | 12/2017 | Chopra | ............... H04L 41/0897 |

OTHER PUBLICATIONS

"Horizontal Pod Autoscaling", https://kubernetes.io/docs/tasks/run-application/horizontal-pod-autoscale, Nov. 26, 2022, 9 pages.
Sawaya, "Is Kubernetes the Cure to Cantankerous 5G Core?", https://www.sdxcentral.com/articles/news/is-kubernetes-the-cure-to-cantankerous-5g-core/2020/03/, Mar. 26, 2020, 8 pages.
Luong et al., "Predictive Autoscaling Orchestration for Cloud-native Telecom Microservices", Nov. 1, 2018, 6 pages.
"Experimental Networked Intelligence (ENI); ENI use cases", ETSI GS ENI 001 V3.0.2 (Sep. 2019), 30 pages.
International Search Report dated Nov. 29, 2021 in connection with International Patent Application No. PCT/KR2021/011207, 4 pages.
Written Opinion of the International Searching Authority dated Nov. 29, 2021 in connection with International Patent Application No. PCT/KR2021/011207, 4 pages.
Combined Search and Examination Report under Sections 17 and 18(3) dated May 20, 2021 in connection with United Kingdom Patent Application No. GB2013324.5, 7 pages.

* cited by examiner

AI AUTOSCALING CONTAINERS IN A CLOUD-NATIVE CORE NETWORK WITH CONTAINERISED NETWORK FUNCTIONS

CROSS-REFERENCE TO RELATED APPLICATIONS

This application is a 371 of International Application No. PCT/KR2021/011207 filed on Aug. 23, 2021, which claims priority to United Kingdom Patent Application No. 2013324.5 filed on Aug. 26, 2020, the disclosures of which are herein incorporated by reference in their entirety.

BACKGROUND

1. Field

The present disclosure generally relates to a method and apparatus for autoscaling containers of a cloud-native core network with containerised network functions, and in particular to enabling the use of one or multiple machine learning models to make autoscaling decisions for one or multiple network functions, individually and/or jointly. Advantageously, this may enable fast and efficient (e.g., only scaling up the necessary numbers of pods) autoscaling of core network functions (e.g. 5G networks), and hence more efficient use of network resources according to different network requirements, e.g., in response to sudden changes in network traffic.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In telecommunications, 5G networks (and subsequent generations) aim to support a wide range of different services and technologies (such as the support of third-party verticals and business requirements). It has been envisaged that an ultra-flexible network architecture is needed to fulfil these requirements. Cloud-native solutions can deliver the scalability and dynamic configurability that 5G demands and therefore, these solutions have been widely accepted in industry as the essential solutions for realising 5G commercial networks. A cloud native 5G core network refers to a core network that is container based and micro services-oriented. Containers are cost-effective and facilitate component reuse. 'Cloud-native' was originally designed, developed, and optimised for cloud technologies. When the cloud-native concept is applied to telecommunication networks, traditional technologies of container orchestration and management that exist in a cloud network are not necessarily suitable for a mobile network (e.g., not being able to use network resources efficiently, or not being able to adapt to changing network requirements). New interfaces and procedures are needed to support the evolvement of the core networks (e.g., for 5G and beyond networks) to a containerized micro-service based infrastructure.

The present disclosure has recognised the need for an improved way for autoscaling containers of a cloud-native core network according to changing network demands and contexts, such as traffic demands.

SUMMARY

In a first approach of the present disclosure, there is provided a computer-implemented method for autoscaling containers of a cloud-native core network with containerised network functions, the method comprising: requesting, from at least one metrics server, at least one metric required to make an autoscaling decision with respect to at least one set of containers; receiving the at least one metric from the metrics server; processing the received at least one metric using a trained machine learning, ML, model, to make an autoscaling decision with respect to the set of containers; and implementing the autoscaling decision with respect to the set of containers. (The phrase "determining . . . at least one autoscaling metric" is used herein to mean that either the ML model determines the autoscaling metric(s) itself with respect to the set of containers, or that the ML model retrieves or obtains some predefined autoscaling metric(s) specified by the human designer(s) of the model. The term "at least one metric" is used interchangeably herein with the term "at least one autoscaling metric"). Advantageously, the present disclosure use a machine learning model to make an autoscaling decision with respect to a set of containers in the network, which means the decision may be made dynamically and proactively, hence enhance the efficiency of network resources utilisation and in turn saves network OPEX (operational cost). Further advantageously, the present disclosure lead to reduced latency in autoscaling, from minutes to seconds, and significantly enhanced network efficiency.

The method may comprise determining at least one autoscaling metric. The ML model may determine the autoscaling metric(s) itself with respect to the set of containers. Alternatively, the ML model may retrieve or obtain some predefined autoscaling metric(s) specified by the human designer(s) of the model. Thus, the method may comprise: obtaining a set of metrics required to make the autoscaling decision with respect to the at least one set of containers, based on a particular network function performed by the set of containers, wherein requesting at least one metric comprises requesting at least one metric selected from the set of metrics. That is, the set of metrics obtained (or determined) are specific to the network function performed by the set of containers. Thus, different networks and different network functions may require different metrics to be used to determine whether the containers need to be scaled-up (also referred to as "scaled-out") or need to be scaled-down (also referred to as "scaled-in").

For a given network, there could be thousands of observable parameters/metrics, and therefore, it is necessary to carefully choose the right metrics for the autoscaling decision-making process and for any specific requirements for the network. This is because each metric is associated with a measurement and signalling cost (i.e. passing the metric to the ML model every few minutes, for example). In order to determine which metrics are the right or more useful metrics for a particular network, the metrics need to be observed to see how the metric is or is not correlated with the function performed by the containers of the network and with the specific problem (autoscaling). The optimum set of metrics for a given network may be determined via experimentation. For example, different sets of metrics may be used to determine whether they can be used to make autoscaling decisions, and the results of these experiments may be used to determine the optimum set.

Each metric in the set of metrics may be weighted depending on an importance of the metric to making the autoscaling decision for the set of containers that perform the particular network function. Again, the weights may be determined via experimentation.

The set of metrics required to make the autoscaling decision may depend on the particular network function performed by the set of containers and operational requirements of the network. In some cases, the operational requirements may comprise at least one of: a latency requirement, and a quality of service, QoS, requirement.

The step of processing the received at least one metric using a trained ML model may comprise: predicting, using the ML model, a future state of the at least one set of containers; and using the predicted state to make an autoscaling decision with respect to the set of containers, wherein the autoscaling decision is one of: do nothing, scale-up, and scale-down. Advantageously, this means that the ML model is predicting what a future state of the network may be based on the current metrics, and this enables an autoscaling decision to be made before any future problems arise. While conventional autoscalers check network traffic periodically and hence can only act after issues in the network have already appeared, the ML model of the present disclosure proactively predicts a network state and makes a decision before the containers need to be scaled.

The ML model may request metrics from the metrics server as many times as necessary for it to make a decision about autoscaling. Thus, the step of requesting the metric from the metrics server may occur at least once. In some cases, the step of requesting the metric from the metrics server may occur at predetermined time intervals, wherein the predetermined time intervals depend on the operational requirements of the network. For example, a metric may be requested every second, every minute or every 5 minutes. It will be understood these are merely example, non-limiting time intervals. Additionally or alternatively, the step of requesting the metric from the metrics server may occur at variable time intervals, wherein the variable time intervals depend on the operational requirements of the network. That is, a metric may be requested at different time intervals depending on the operational requirements of the network. At times when the operational requirements of the network require decisions on autoscaling to be made quickly (perhaps during certain times of the day when network traffic is at a peak), then the metrics may be requested more often or more frequently than at other times.

The step of receiving at least one metric from the metrics server may comprise receiving, for the set of containers, at least one of: processor utilisation for each container in the set, memory utilisation for each container in the set, and at least one task performed by the set of containers. It will be understood that additional or alternative metrics may be used by the ML model depending on, for example, what information it needs for a particular cell of the cellular network or what function(s) the set of containers are performing.

The set of containers may comprise one or more containers. The step of implementing the autoscaling decision with respect to the set of containers may comprise creating at least one replica container (i.e. scaling up or scaling out). This may be performed if more resource is required to implement the function(s) of the set of containers and the current number of containers is not sufficient. This may occur if, for example, there is a sudden increase in network traffic in a particular location (cell) of the cellular network, such as when thousands of people gather in a stadium to watch sports.

The set of containers may comprise two or more containers. The step of implementing the autoscaling decision with respect to the set of containers may comprise destroying at least one container (i.e. scaling down or scaling in). This may be performed if the existing containers are not being fully utilised to implement the function(s) of the set of containers. This may occur if, for example, there is a sudden decrease in network traffic in a particular location of the cellular network, such as when thousands of people leave a stadium to go home after watching sports.

In some cases, the step of implementing the autoscaling decision with respect to the set of containers may comprise taking no action. This may occur if the ML model determines the existing number of containers within the set of containers is sufficient to implement the function(s) of the set of containers.

As described below with respect to the Figures, a network may comprise multiple sets of containers. Thus, the step of receiving at least one metric from a metrics server regarding at least one set of containers may comprise: receiving at least one metric for each container of a first set of containers; and receiving at least one metric for each container of a second set of containers. In other words, the metrics server may provide metrics for multiple sets of containers.

In some cases, a single ML model may be used to make a decision with respect to multiple sets of containers. In this example, the processing step may comprise: processing the received at least one metric for the first set of containers and the second set of containers using the ML model to make a first autoscaling decision with respect to the first set of containers, and a second autoscaling decision with respect to the second set of containers.

In some other cases, multiple ML models may be used to make decisions with respect to multiple sets of containers. That is, each set of containers may be autoscaled by a dedicated ML model. In this example, the processing step may comprise: processing the received at least one metric for the first set of containers using a first ML model to make a first autoscaling decision with respect to the first set of containers, and processing the received at least one metric for the second set of containers using a second ML model to make a second autoscaling decision with respect to the second set of containers.

In a particular example, the at least one set of containers may perform a 5G Core Access and Mobility Management Function, AMF. AMFs are used to perform session management within a 5G network service based architecture (SBA). In this example, the ML model may be making an autoscaling decision with respect to the AMFs. Here, the step of receiving the at least one metric may comprise receiving: a number of incoming user equipment, UE, requests (i.e. how many UEs have successfully attached to the network); a number of AMF containers currently deployed (i.e. how many replicas of the AMF containers are active); a rate of memory allocation for each AMF container with respect to registering and admitting each UE to the network (measured in bytes/time, this metric is indicative of the load that the AMF is under and is received directly from the function that is handling the user registrations inside the AMF); a time cumulative moving average of the rate of memory allocation for each AMF container (i.e. a metric that is used to highlight long-term trends of memory allocation and create a smoother perspective for mean usage over time); traffic rate information for data received by each AMF container from each UE (measured in bytes/time, this metric indicates traffic sent from the UEs for attaching to the network); and traffic rate information for data transmitted by each AMF container to each UE (measured in bytes/time, this metric indicates traffic responses sent from the AMF to the UEs). Thus, the step of processing the received at least one metric to make an autoscaling decision may comprise determining whether the number of AMF containers currently deployed is sufficient for handling the number of incoming UE requests. The metrics may be measured every five minutes, for example.

In a second approach of the present disclosure, there is provided an apparatus for autoscaling containers of a cloud-native core network with containerised network functions, the apparatus comprising: at least one processor coupled to memory and arranged to: request, from at least one metrics server, at least one metric required to make an autoscaling decision with respect to at least one set of containers; receive the at least one metric from the metrics server; process the received at least one metric using a trained machine learning, ML, model, to make an autoscaling decision with respect to the set of containers; and implement the autoscaling decision with respect to the set of containers.

The features described above with respect to the first approach apply equally to the second approach.

In a third approach of the present disclosure, there is provided a system for autoscaling containers of a cloud-native core network with containerised network functions, the system comprising: at least one set of containers; at least one metrics server communicatively coupled to the at least one set of containers; storage, coupled to the at least one metrics server, for storing current and historical metrics for the at least one set of containers; and at least one artificial intelligence, AI, module comprising at least one processor coupled to memory, the AI module arranged to: request, from the at least one metrics server, at least one metric; receive the at least one metric from the at least one metrics server; process the received at least one metric using the ML model to make an autoscaling decision with respect to the set of containers; and implement the autoscaling decision with respect to the set of containers.

The features described above with respect to the first approach apply equally to the third approach.

The at least one metrics server may be configured to: request metrics from the at least one set of containers; and store metrics received from the at least one set of containers in the storage.

The at least one metrics server may be configured to: receive the request from the AI module; determine whether the requested at least one metric is available in the storage; and provide, to the AI module, the requested at least one metric when available in the storage.

When the requested at least one metric is not available in storage, the at least one metrics server may be configured to: request, in real-time, the at least one metric from the at least one set of containers; store the at least one metric received from the at least one set of containers in storage; and provide, to the AI module, the requested at least one metric.

The step of receiving at least one metric may comprise receiving, forth set of containers, at least one of: processor utilisation for each container in the set, memory utilisation for each container in the set, and at least one task performed by the set of containers.

In the system, the set of containers may comprise one or more containers. Implementing the autoscaling decision with respect to the set of containers may comprise creating at least one replica container (i.e. scaling-up).

In the system, the set of containers may comprise two or more containers. Implementing the autoscaling decision with respect to the set of containers may comprise destroying at least one container (i.e. scaling-down).

In some cases, the cloud-native network may be a 5G cellular network to which a plurality of user equipment, UE, may connect.

In the 5G context, at least one set of containers may perform a 5G Core Access and Mobility Management Function, AMF. Here, receiving the at least one metric at the AI module may comprise receiving: a number of incoming user equipment, UE, requests; a number of AMF containers currently deployed; a rate of memory allocation for each AMF container with respect to registering and admitting each UE to the network; a time cumulative moving average of the rate of memory allocation for each AMF container; traffic rate information for data received by each AMF container from each UE; and traffic rate information for data transmitted by each AMF container to each UE. Thus, processing the received at least one metric to make an autoscaling decision may comprise determining whether the number of AMF containers currently deployed is sufficient for handling the number of incoming UE requests.

As mentioned above, determining the metrics that can be used to make an autoscaling decision with respect to a particular network may be determined by experimentation. Thus, in a fourth approach of the present disclosure there is provided a method for autoscaling containers of a cloud-native core network with containerised network functions, the method comprising: determining a set of autoscaling metrics required to make an autoscaling decision with respect to at least one set of containers, based on a particular network function performed by the set of containers.

Each metric in the set of metrics may be weighted depending on an importance of the metric to making the autoscaling decision for the set of containers that perform the particular network function.

The set of metrics required to make the autoscaling decision may depend on the particular network function performed by the set of containers and operational requirements of the network. The operational requirements may comprise at least one of: a latency requirement, and a quality of service, QoS, requirement.

In a specific example, the at least one set of containers perform a 5G Core Access and Mobility Management Function, AMF, and in this case, the set of autoscaling metrics may comprise at least one of: a number of incoming user equipment, UE, requests; a number of AMF containers currently deployed; a rate of memory allocation for each AMF container with respect to registering and admitting each UE to the network; a time cumulative moving average of the rate of memory allocation for each AMF container; traffic rate information for data received by each AMF container from each UE; and traffic rate information for data transmitted by each AMF container to each UE.

The method described above may be wholly or partly performed on an apparatus, i.e. an electronic device, using a machine learning or artificial intelligence model. The model may be processed by an artificial intelligence-dedicated processor designed in a hardware structure specified for artificial intelligence model processing. The artificial intelligence model may be obtained by training. Here, "obtained by training" means that a predefined operation rule or artificial intelligence model configured to perform a desired feature (or purpose) is obtained by training a basic artificial intelligence model with multiple pieces of training data by a training algorithm. The artificial intelligence model may include a plurality of neural network layers. Each of the plurality of neural network layers includes a plurality of weight values and performs neural network computation by computation between a result of computation by a previous layer and the plurality of weight values.

As mentioned above, the present disclosure may be implemented using a machine learning, ML, model, or an artificial intelligence, AI, module or model. A function associated with AI may be performed through the non-volatile memory, the volatile memory, and the processor. The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors control the processing of the input data in accordance with a predefined operating rule or artificial intelligence (AI) model stored in the non-volatile memory and the volatile memory. The predefined operating rule or artificial intelligence model is provided through training or learning. Here, being provided through learning means that, by applying a learning algorithm to a plurality of learning data, a predefined operating rule or AI model of a desired characteristic is made. The learning may be performed in a functional block itself in which AI according to an embodiment is performed, and/o may be implemented through a separate server/system.

The AI model may consist of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target (for example, a particular network request) using a plurality of learning data to cause, allow, or control the autoscaling functional block to make a determination or prediction. Examples of learning algorithms include, but are not limited to, supervised learning, unsupervised learning, semi-supervised learning, or reinforcement learning.

In a related approach of the present disclosure, there is provided a non-transitory data carrier carrying processor control code to implement the methods described herein.

As will be appreciated by one skilled in the art, the present disclosure may be embodied as a system, method or computer program product. Accordingly, present disclosure may take the form of an entirely hardware embodiment, an entirely software embodiment, or an embodiment combining software and hardware aspects.

Furthermore, the present disclosure may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present disclosure may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

Embodiments of the present disclosure also provide a non-transitory data carrier carrying code which, when implemented on a processor, causes the processor to carry out any of the methods described herein.

The present disclosure further provide processor control code to implement the above-described methods, for example on a general purpose computer system or on a digital signal processor (DSP). The present disclosure also provide a carrier carrying processor control code to, when running, implement any of the above methods, in particular on a non-transitory data carrier. The code may be provided on a carrier such as a disk, a microprocessor, CD- or DVD-ROM, programmed memory such as non-volatile memory (e.g. Flash) or read-only memory (firmware), or on a data carrier such as an optical or electrical signal carrier. Code (and/or data) to implement embodiments of the present disclosure described herein may comprise source, object or executable code in a conventional programming language (interpreted or compiled) such as Python, C, or assembly code, code for setting up or controlling an ASIC (Application Specific Integrated Circuit) or FPGA (Field Programmable Gate Array), or code for a hardware description language such as Verilog (RTM) or VHDL (Very high speed integrated circuit Hardware Description Language). As the skilled person will appreciate, such code and/or data may be distributed between a plurality of coupled components in communication with one another. The present disclosure may comprise a controller which includes a microprocessor, working memory and program memory coupled to one or more of the components of the system.

It will also be clear to one of skill in the art that all or part of a logical method according to embodiments of the present disclosure may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present disclosure may be realised in the form of a data carrier having functional data thereon, said functional data comprising functional computer data structures to, when loaded into a computer system or network and operated upon thereby, enable said computer system to perform all the steps of the above-described method.

One of the advantages of the present disclosure is that the ML model is able to use historical data measured in the past to make a decision. The data is stored by the metrics server(s) in a data repository. (The term "data repository" is used interchangeably herein with the term "storage"). This means that the ML model is able to query or request historical data in the data repository at any time in order to make decisions on autoscaling. However, if the data or metric required by the ML model is not stored in the data repository, the ML model may request the metrics server to obtain real-time data from the set of containers. As explained in more detail below with respect to the Figures, this is a significant departure from existing autoscaling techniques, which enables the present disclosure to make decisions faster and more efficiently. Thus, the step of receiving the at least one metric from the metrics server may comprise receiving a historical metric from storage. Additionally or alternatively, receiving the at least one metric may comprise receiving a real-time metric from the set of containers via the metrics server.

DETAILED DESCRIPTION

Broadly speaking, the present disclosure relate to methods, apparatuses and systems for autoscaling containers of a cloud-native core network with containerised network functions. In particular, the present disclosure use artificial intelligence and machine learning models to make an autoscaling decision. Advantageously, this may enable fast autoscaling of cellular networks (e.g. 5G networks) in response to sudden changes in network traffic.

Figure 1:
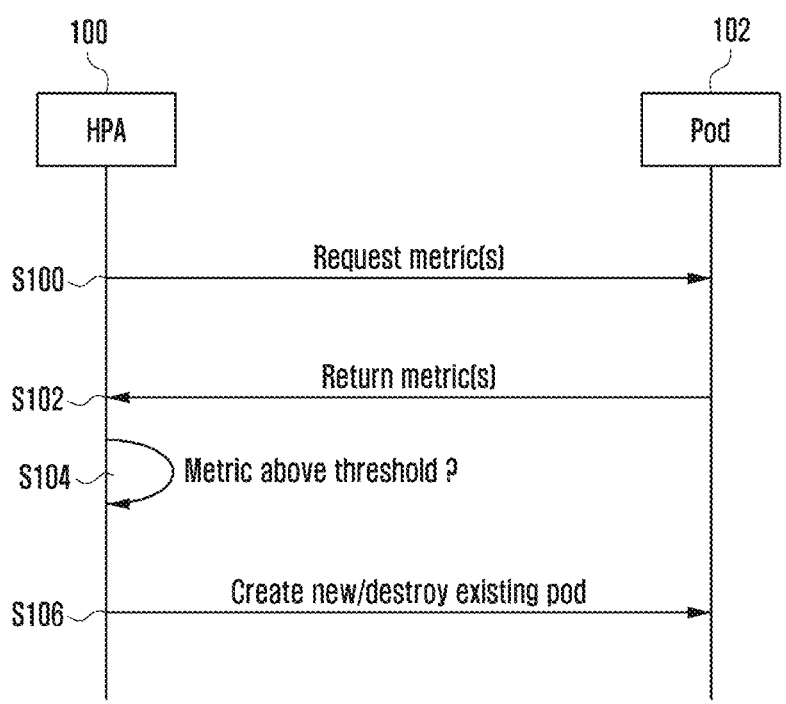
FIG. 1 is a schematic diagram of an existing method to perform autoscaling using a horizontal pod autoscaler (HPA).

FIG. 1 is a schematic diagram of an existing method to perform autoscaling using a horizontal pod autoscaler (HPA) 100. In existing technologies, the HPA function 100 within Kubernetes deals with container autoscaling, which automatically scales the number of pods 102 in a replication controller, deployment, or replica set based on observed CPU utilization as a default metric. The HPA 100 requests metrics measurements periodically from the container(s) 102 (step S100). Only a single container or pod 102 is shown here, but it will be understood that the HPA 100 may request metrics from a set of containers 102. At step S102, the or each container 102 returns the requested metric (e.g. CPU utilisation) to the HPA 100. The HPA 100 then uses the received metric(s) to determine if the metric are above or below a threshold used to determine whether to scale-up or scale-down the set of containers 102 (step S104). An algorithm implemented by the HPA 100 decides whether to scale-up or scale-down by comparing CPU utilisation against a pre-defined threshold CPU utilisation value. If the requested metric for CPU utilisation is greater than then threshold value, then the HPA 100 instructs a new pod 102 to be spawned/created, while if the requested metric for CPU utilisation is lower than then threshold value, then the HPA 100 instructs an existing pod 102 to be destroyed (step S106).

HPA, or indeed Kubernetes orchestration is based on functionalities provided for a cloud network. When Kubernetes and its underlining functions, including HPA, are directly applied to cloud-native 5G mobile networks, it is expected that Kubernetes will become sub-optimal. This is because several drawbacks exist in CPU-based autoscaling solutions in Kubernetes. The most significant drawbacks are:

(1) a long response time needed to scale up a pod. This problem becomes significant when the request in a mobile network needs to be responded within a short period of time. For example, a user equipment (UE) attachment request needs to be responded to quickly. Experimental data shown in FIG. 9 indicates that it takes 10 minutes for existing CPU-based autoscaling technologies to respond to increased UE attachment request, which is not an acceptable latency.

(2) Ping-pong effect, where the pods are scaled up then subsequently scaled down.

(3) Waste of network resources, where the pods are scaled unnecessarily. Experimental data shown in FIG. 11 indicates that existing CPU-based autoscaling technologies will spawn an unnecessary number of containers without their resource being used.

Figure 2:
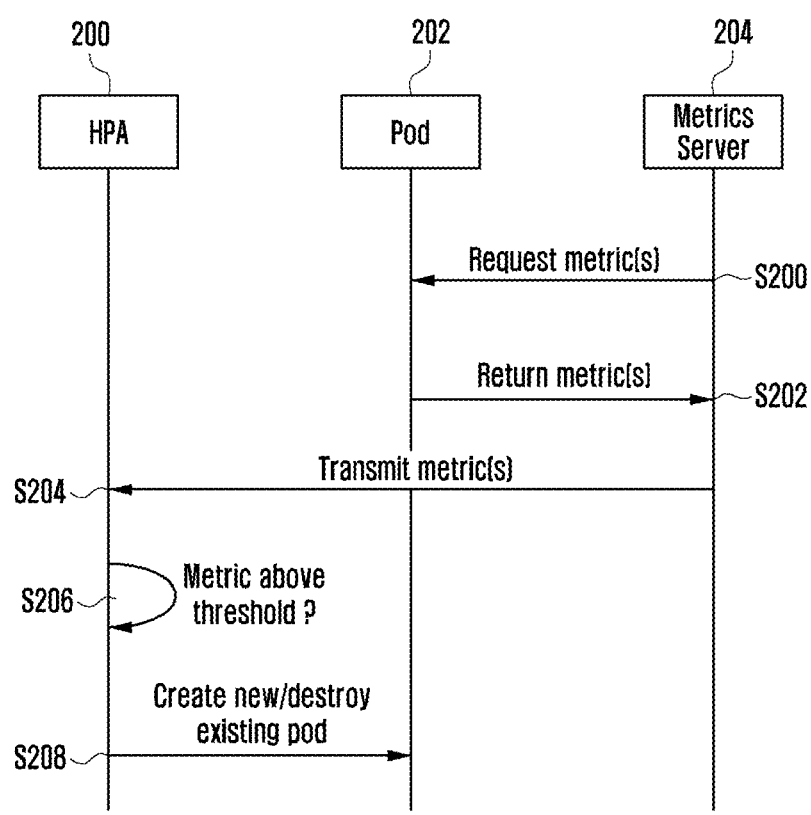
FIG. 2 is a schematic diagram of an existing method to perform autoscaling using a horizontal pod autoscaler (HPA) in Kubernetes.

Existing Kubernetes autoscaling also allows customised metric server and APIs, which are desired for application-specific metrics. FIG. 2 is a schematic diagram of an existing method to perform autoscaling using a horizontal pod autoscaler (HPA) in Kubernetes, and in particular shows the procedure for fetching customised metrics.

In FIG. 2, a customer metrics server 204 periodically queries, measures and obtains the required metrics from the container(s) or pod(s) 202. Thus, the metrics server 204 may periodically request metrics from each container 202 in a set of containers (step S200), and may receive the requested metrics from the container 202 (step S202). The collected metrics may then be transmitted to the HPA 200 (step S204). In particular, the collected metrics may be exposed to HPA 200 via an API (not shown) of the metrics server 204. The HPA 200 may then perform the same algorithm as described above with respect to FIG. 1, i.e. may compare the collected metric(s) to a threshold (step S206) and use this to make a decision on whether to create new containers or destroy existing pods (step S208).

Although the customer metrics allow application specific metrics to be considered in the autoscaling process, these metrics are, in most cases, designed to handle cloud applications, e.g., web services. In addition, the current autoscaling design for cloud services are mostly based on measuring node resource utilization and therefore, does not provide the context of the network.

Figure 3:
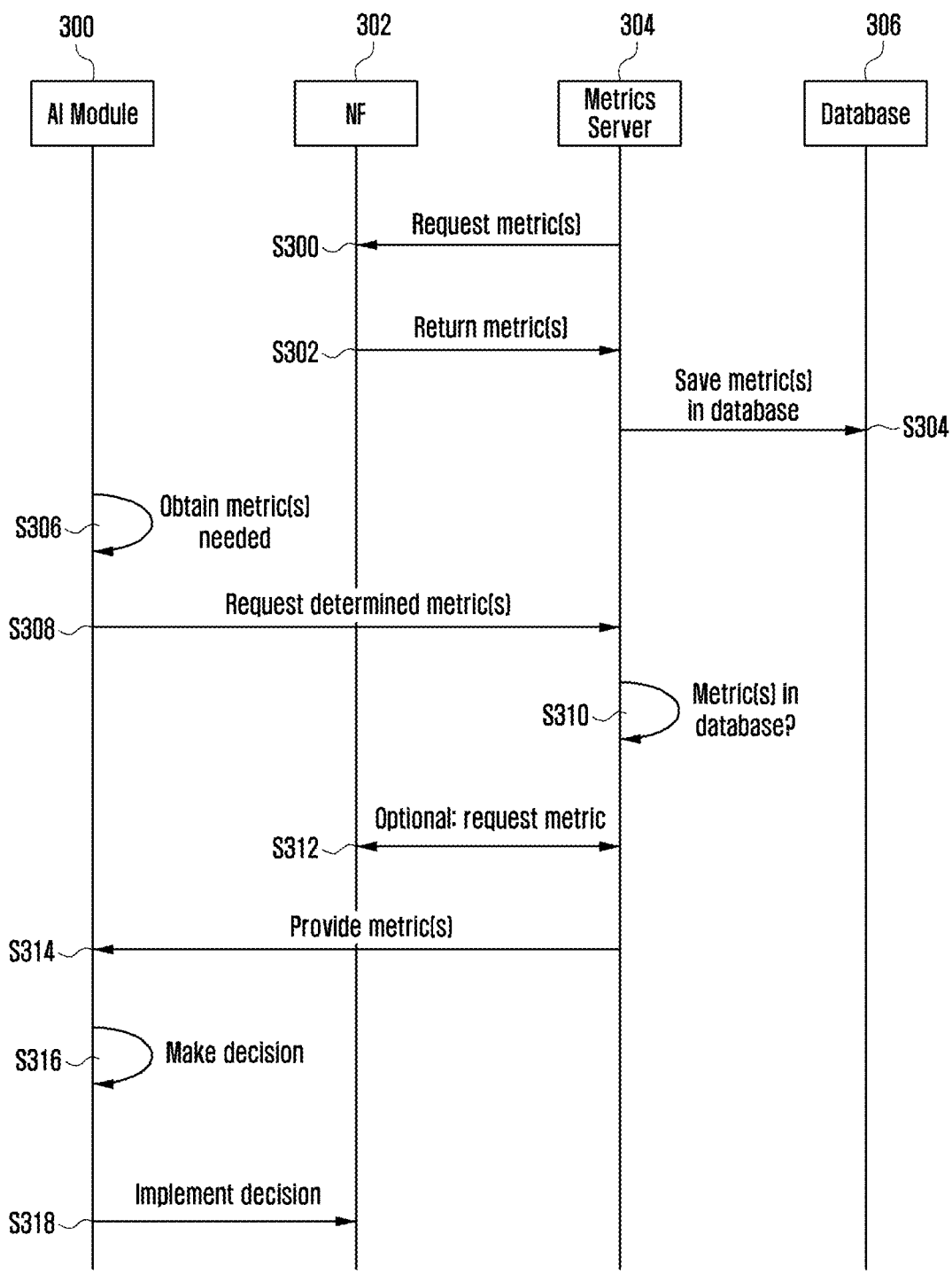
FIG. 3 is a schematic diagram of a method to perform autoscaling using an artificial intelligence (AI) module and machine learning (ML) model, according to the present disclosure.

FIG. 3 is a schematic diagram of a method to perform autoscaling using an artificial intelligence (AI) module 300 comprising a machine learning (ML) model. The present disclosure provide a method for autoscaling containers of a cloud-native core network with containerised network functions. Here, a metrics server 304 may periodically request metrics from a containerised network function 302. A single container or network function 302 is shown here for the sake of simplicity, but it will be understood the metrics server 304 may request metrics from at least one set of containers. The metrics server may receive the requested metrics from the container 302 (step S302) and may store the metrics in a database or storage 306 (step S304). Thus, the present disclosure may make use of a data repository containing metrics, historical and recent, to make an autoscaling decision, rather than only relying on real-time or current metrics.

The method of the present disclosure comprises: providing to a machine learning, ML, model in the AI module 300, at least one metric required to make an autoscaling decision with respect to at least one set of containers, based on a function performed by the set of containers (step S306). Thus, the AI module 300 takes into account what specific network function is being performed by the set of containers. This is advantageous because the autoscaling decision may vary depending on function. Further advantageously, the function may dictate the frequency of autoscaling decisions, or how often the AI module 300 should check if the set of containers needs to be autoscaled. Thus, the present disclosure use a machine learning model to make an autoscaling decision with respect to a set of containers in the network, which means the decision may be made dynamically and proactively. The AI module 300 does not need to wait for the metrics server to collect metrics and provide the collected metrics—instead, the AI module can request the metrics whenever it need s to make a decision with respect to a specific set of containers that are performing a specific function(s).

For a given network, there could be thousands of observable parameters/metrics, and therefore, it is necessary to carefully choose the right metrics for the autoscaling decision-making process and for any specific requirements for the network. This is because each metric is associated with a measurement and signalling cost (i.e. passing the metric to the ML model every few minutes, for example). In order to determine which metrics are the right or more useful metrics for a particular network, the metrics need to be observed to see how the metric is or is not correlated with the function performed by the containers of the network and with the specific problem (autoscaling). The optimum set of metrics for a given network may be determined via experimentation. For example, different sets of metrics may be used to determine whether they can be used to make autoscaling decisions, and the results of these experiments may be used to determine the optimum set.

Each metric in the set of metrics may be weighted depending on an importance of the metric to making the autoscaling decision for the set of containers that perform the particular network function. Again, the weights may be determined via experimentation.

The set of metrics required to make the autoscaling decision may depend on the particular network function performed by the set of containers and operational requirements of the network. In some cases, the operational requirements may comprise at least one of: a latency requirement, and a quality of service, QoS, requirement.

The AI module 300 may request, from the metrics server 304, at least one metric. One of the advantages of the present disclosure is that the ML model is able to use historical data to make a decision, which is stored by the metrics server(s) 304 in the data repository 306. This means that the ML model is able to query or request historical data in the data repository 306 at any time in order to make decisions on autoscaling. However, if the data or metric required by the ML model is not stored in the data repository 306, the ML model may request the metrics server 304 to obtain real-time data from the set of containers 302.

Thus, the metrics server 304 may determine if the requested metric is in the database 306 (step S310). If the requested metric is in the database 306, the metrics server 304 may retrieve this metric and provide it to the AI module 300. If the requested metric is not in the database 306, the metrics server 304 may request the metric from the container(s) (step S312) and store the metric in storage 306, before providing it to the AI module 300.

Thus, the method may comprise receiving, at the AI module 300, the at least one metric from the metrics server (step S314) and then processing the received at least one metric using the ML model, to make an autoscaling decision with respect to the set of containers (step S316). The step (S316) of processing the received at least one metric using the trained ML model may comprise: predicting, using the ML model, a future state of the at least one set of containers; and using the predicted state to make an autoscaling decision with respect to the set of containers, wherein the autoscaling decision is one of: do nothing, scale-up, and scale-down. Advantageously, this means that the ML model is predicting what a future state of the network may be based on the current metrics, and this enables an autoscaling decision to be made before any future problems arise. While conventional autoscalers check network traffic periodically and hence can only act after issues in the network have already appeared, the ML model of the present disclosure proactively predicts a network state and makes a decision before the containers need to be scaled.

The AI module 300 may then implement the autoscaling decision with respect to the set of containers (step S318). The autoscaling decision may be to scale-up, scale-down or do nothing.

Thus, the present disclosure enable AI-based container autoscaling in a cloud native core network (such as a 5G network). In a 5G network, this may enable AI-based container orchestration for mobile network applications, such as UE attachment requests.

Some differences between the present disclosure and the existing cloud autoscaler (shown in FIG. 2) are as follows:
(1) The present disclosure may enable real-time network contexts collection/storage/exchange/extraction in a cloud native 5G network, that facilitates AI-enabled orchestration of network function (as containers). In contrast, existing technologies get the pod measurements periodically to generate the HPA metrics, and do not facilitate the use of the information in historical network context data.
(2) The present disclosure may enable proactive autoscaling. In contrast, existing autoscaler techniques are reactive, e.g. they fetch measured metrics every 5 minutes, then use this information for autoscaling.
(3) The present disclosure use one or multiple AI modules for mobile services, to replace the current HPA in cloud services, and therefore can generate optimal customised metrics according to different services. Existing technologies have only very limited metrics (even though this can be customised).
(4) The present disclosure provide apparatuses, APIs and procedures that are needed to generate optimal customised metrics for one or multiple AI modules, while existing HPA metrics may not be optimal for mobile services.

The present disclosure provide an autoscaling mechanism which enables: optimisation of customer metrics according to different mobile services; data flow, interfaces and mechanisms to be designed that enable AI-based autoscaling in 5G networks, for proactive autoscaling in mobile services/applications; and data flow, interfaces and mechanisms to be designed that enable AI-based autoscaling in 5G networks, where multiple network functions (as containers) that need to be orchestrated simultaneously.

Figure 4:
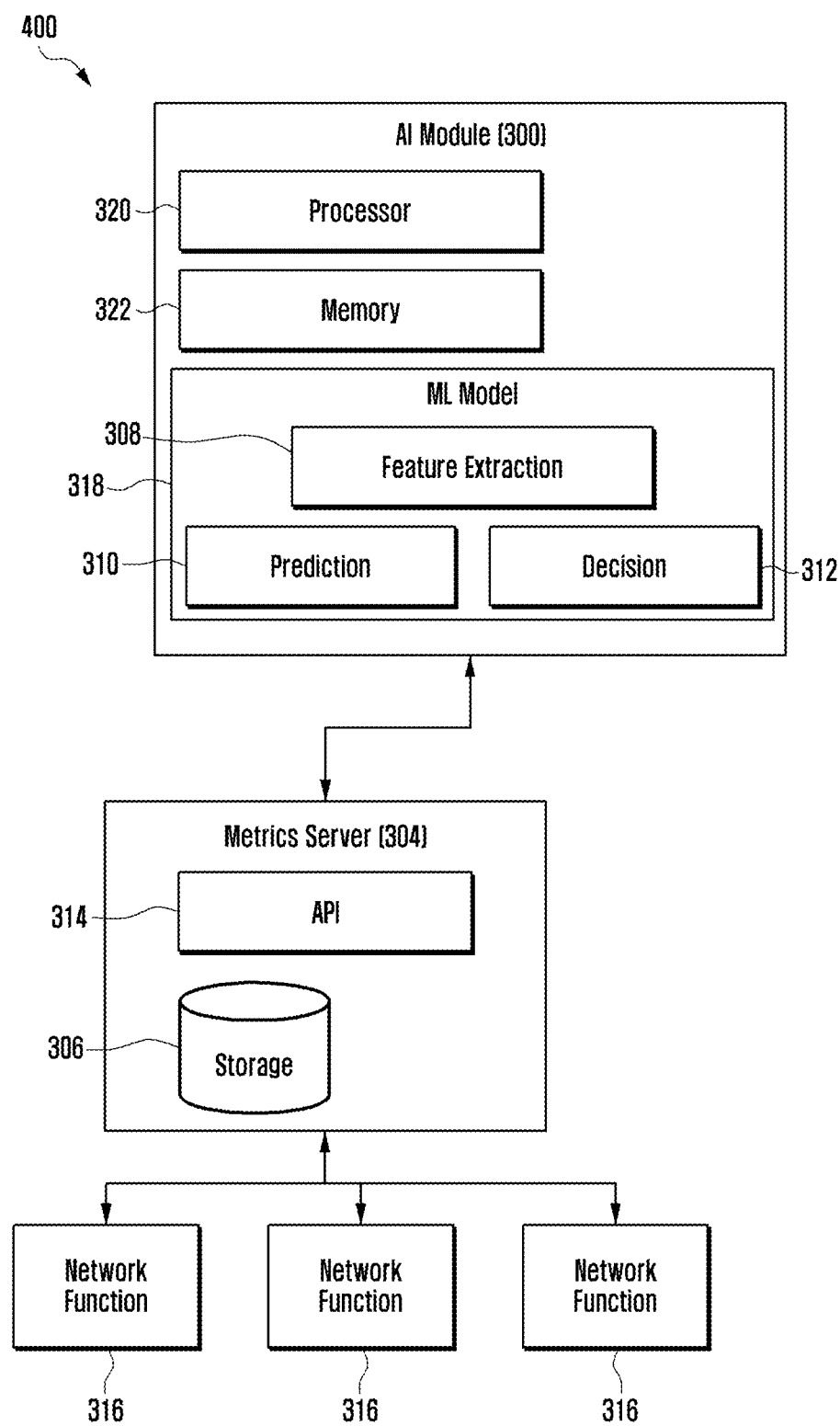
FIG. 4 is a schematic diagram of a system to perform autoscaling using an AI module.

FIG. 4 is a schematic diagram of a system 400 to perform autoscaling using an AI module. The term "AI module" is used interchangeably herein with the term "intelligent module", "machine learning model" and "ML model".

The system 400 is for autoscaling containers of a cloud-native core network with containerised network functions. The system 400 comprises at least one set of containers 316. Here, three containers or network functions 316 are shown, but it will be understood that each set of containers may one or more containers.

The system 400 comprises at least one metrics server 304 communicatively coupled to the at least one set of containers 316.

The system 400 comprises storage 306, coupled to the at least one metrics server 304, for storing current and historical metrics for the at least one set of containers 316.

The metrics of a particular NF 316 and its spawned replicas are queried and collected by the metric server 304. The metrics server 304 could collect default metrics (such as CPU utilization) or customer-specific metrics. The collected metrics are then stored in the storage/data repository 306. The data repository may store data collected in the past as well (i.e. historical metrics).

The system 400 comprises at least one artificial intelligence, AI, module 300. The AI module 300 comprises at least one processor 320 coupled to memory 322, and a machine learning (ML) model 318. A possible architecture of the ML model 318 is shown in FIG. 8B. FIG. 8B is a schematic diagram of an architecture of an AI module or ML model used to perform autoscaling. The ML model 318 may be a deep neural network (DNN), such as a DNN wavenet. It can be seen that the DNN comprises an encoding stage, which may be used to perform feature extraction from the received metric(s), and a decoding stage. Specific layers of the DNN are shown in FIG. 8B. It will be understood that this is an example architecture and example layers, and any suitable architecture may be used to implement the ML model.

The AI module 300 is arranged to: request, from the at least one metrics server 304, at least one metric; receive the at least one metric from the at least one metrics server 304; process the received at least one metric using the ML model 318 to make an autoscaling decision with respect to the set of containers 316; and implement the autoscaling decision with respect to the set of containers 316. The AI module, or the ML model 318, may comprise a feature extraction stage 308, a prediction stage 310, and a decision stage 312, where the decision stage may make the autoscaling decision with respect to the set of containers 316.

The AI module 300 may have knowledge about the functions (e.g. services) being performed by each container 316. For example, if the container is an AMF, the AMF may perform the service of UE attachment. The AI module 300 may use this knowledge to send requests for particular data/metrics from the metrics server 304 and data repository 306. In the example above, the intelligent module may request data/metrics such as UE to AMF traffic or AMF to UE traffic. Such data may be customised in terms of, for example, time granularity and different correlations of the data. The data/metrics may be provided to the AI module 300 via an API 314 of the metrics server 304.

In some cases, the step of requesting the metric from the metrics server may occur at predetermined time intervals, wherein the predetermined time intervals depend on the operational requirements of the network. For example, a metric may be requested every second, every minute or every 5 minutes. It will be understood these are merely example, non-limiting time intervals. Additionally or alternatively, the step of requesting the metric from the metrics server may occur at variable time intervals, wherein the variable time intervals depend on the operational requirements of the network. That is, a metric may be requested at different time intervals depending on the operational requirements of the network. At times when the operational requirements of the network require decisions on autoscaling to be made quickly (perhaps during certain times of the day when network traffic is at a peak), then the metrics may be requested more often or more frequently than at other times.

The AI module 300, using the data exposed through customer API 314, will then perform AI algorithms to make an optimal decision on autoscaling of the particular set of containers 316 for which the data has been obtained, according to the functions performed by the containers 316. The metrics used by the AI module 300 may include a time/latency required for UE attachment, and the number of UEs that can be accommodated in the network. It will be understood these are non-limiting examples of metrics. The decisions may be to scale up (spawn one or multiple new replicas), scale down (destroy one or multiple replicas), and/or do nothing. It will be understood that other actions/decisions may be taken.

The present disclosure comprise a data collection and storage procedure between the deployed pod/container 316 and the customer metrics server 304. In particular, (historical) data collected at different time scale and instances may be stored in the data repository 306 for subsequent usage. One major difference between the present disclosure and the existing solutions is that while existing solutions query the containers (CPU utilization for example) periodically and at a given time instance, only the data at a specific time instance is used for subsequent decision making, and then discarded. The present disclosure enable historical data to be stored in a data repository for future use.

The present disclosure comprise a data request and exposure procedure, controlled by the intelligent module 300, that allows data to be selectively exposed, according to the service requests, from customer metrics server 304, through customer metrics API 314, to the intelligent module 301. The service requests are known to the intelligent module 300, which decides and requests what collected data need to be exposed, through an interface between the intelligent module and customer metrics server. The stored data are then selectively exposed to customer metrics API 314, according to different services and requests. One major difference between the present disclosure and the existing solutions is existing autoscaling techniques make the autoscaling decision based on the metrics gathered at the current and instant time instance, while the present disclosure make the autoscaling decision based on historical and predicted data. Another difference is that existing autoscaling techniques make the autoscaling decision based on metrics queried by customer metrics server, and it is a fixed metrics, even though can be customized, for a specific service requests. The present disclosure enable metrics to be not only customized, but also dynamically chosen according to the different service requests/applications. This is because the existing metrics server 204 makes query of metrics from the deployed pods, while the present disclosure obtains metrics from the data repository 306 where data can be dynamically extracted. It is noted that the data could also be requested from third party metric vendors.

Thus, the at least one metrics server 304 may be configured to: request metrics from the at least one set of containers 316; and store metrics received from the at least one set of containers 316 in the storage 306.

The at least one metrics server 304 may be configured to: receive the request from the AI module 300; determine whether the requested at least one metric is available in the storage 306; and provide, to the AI module 300, the requested at least one metric when available in the storage 306. However, when the requested at least one metric is not available in storage 306, the at least one metrics server 304 may be configured to: request, in real-time, the at least one metric from the at least one set of containers 316; store the at least one metric received from the at least one set of containers 316 in storage 306; and provide, to the AI module 300, the requested at least one metric.

It is known that at a given time instance (time t), the existing autoscaler makes query (measurements of CPU utilization for example) of the deployed pods. It then use these metrics to compare them to pre-defined thresholds, and makes an autoscaling decision. This decision is then executed, and can only be changed in the next time period. If it is found that the autoscaling decision needs another metric, this metric can only be obtained in the next time period, while the current autoscaling decision will have to live with the lack of that metric.

The present disclosure provides a much more flexible and dynamic data collection and exposure procedure. First of all, all measurements, historical or current, may be needed for making the autoscaling decision at a particular time instance, and these measurements will be collected and stored at the data repository. The required data for AI module to make the autoscaling decision making, is then passed to the AI module. If the AI module finds that new data is needed, it will request data from the data repository (without needing to wait for the next time period). If the requested data is not available in the data repository, new measurement requests are then made by the data repository/metrics server to the deployed pods. The data provided to AI autoscaling module, is therefore in real-time, and enables a closed-loop decision making process.

The step of receiving at least one metric at the AI module 300 may comprise receiving, for the set of containers 316, at least one of: processor utilisation for each container in the set, memory utilisation for each container in the set, and at least one task performed by the set of containers.

Thus, the storage 306 can store new data and discard old data, collected over time by the metrics server, according to the time instance and service provided dynamically. This is different from the existing autoscaling metrics server where data is queried periodically on a needed basis, and when obtained, after fed it to the metric server API, will then be discarded. The customer metrics are then queried for the next time period. In the existing techniques, there is no dynamic selection of the data (from the past and current time instances, and from the measurements available) for a particular time instance.

In the system, the set of containers may comprise one or more containers. Implementing the autoscaling decision with respect to the set of containers may comprise creating at least one replica container (i.e. scaling-up).

In the system, the set of containers may comprise two or more containers. Implementing the autoscaling decision with respect to the set of containers may comprise destroying at least one container (i.e. scaling-down).

In some cases, the cloud-native network may be a 5G cellular network to which a plurality of user equipment, UE, may connect.

Figure 5:
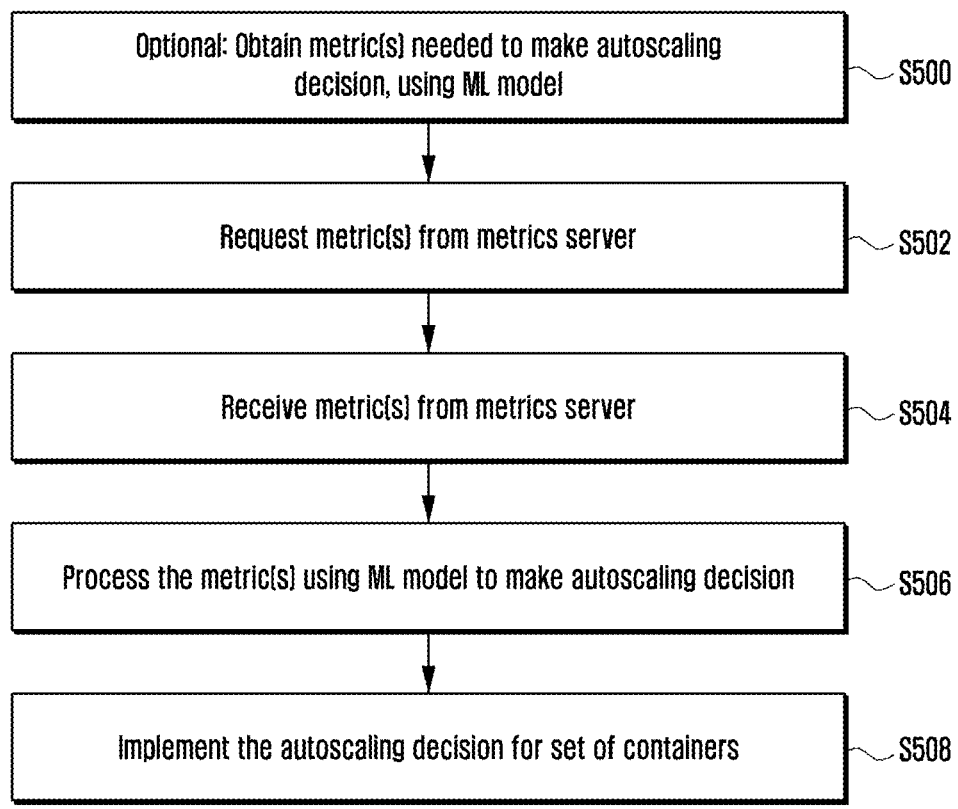
FIG. 5 is a flowchart of example steps to perform autoscaling using an AI module.

FIG. 5 is a flowchart of example steps to perform autoscaling using an AI module 300. The method may optionally begin by determining, a set of metrics required to make an autoscaling decision with respect to at least one set of containers, based on a function performed by the set of containers (step S500). The set of metrics may comprise a single metric or a plurality of metrics. This step may be performed only once for a given network. This step may be performed by experimentation. Once the set of metrics has been determined, the set of metrics is provided to (i.e. obtained by) the AI module/ML model.

The method may comprise requesting, from at least one metrics server, at least one metric (step S502) and receiving the at least one metric from the metrics server (step S504). The method may comprise processing the received at least one metric using the ML model, to make an autoscaling decision with respect to the set of containers (step S506). The step of processing the received at least one metric using a trained ML model may comprise: predicting, using the ML model, a future state of the at least one set of containers; and using the predicted state to make an autoscaling decision with respect to the set of containers, wherein the autoscaling decision is one of: do nothing, scale-up, and scale-down. Once the decision has been made, the AI module may implement the autoscaling decision with respect to the set of containers (step S508).

Figure 6:
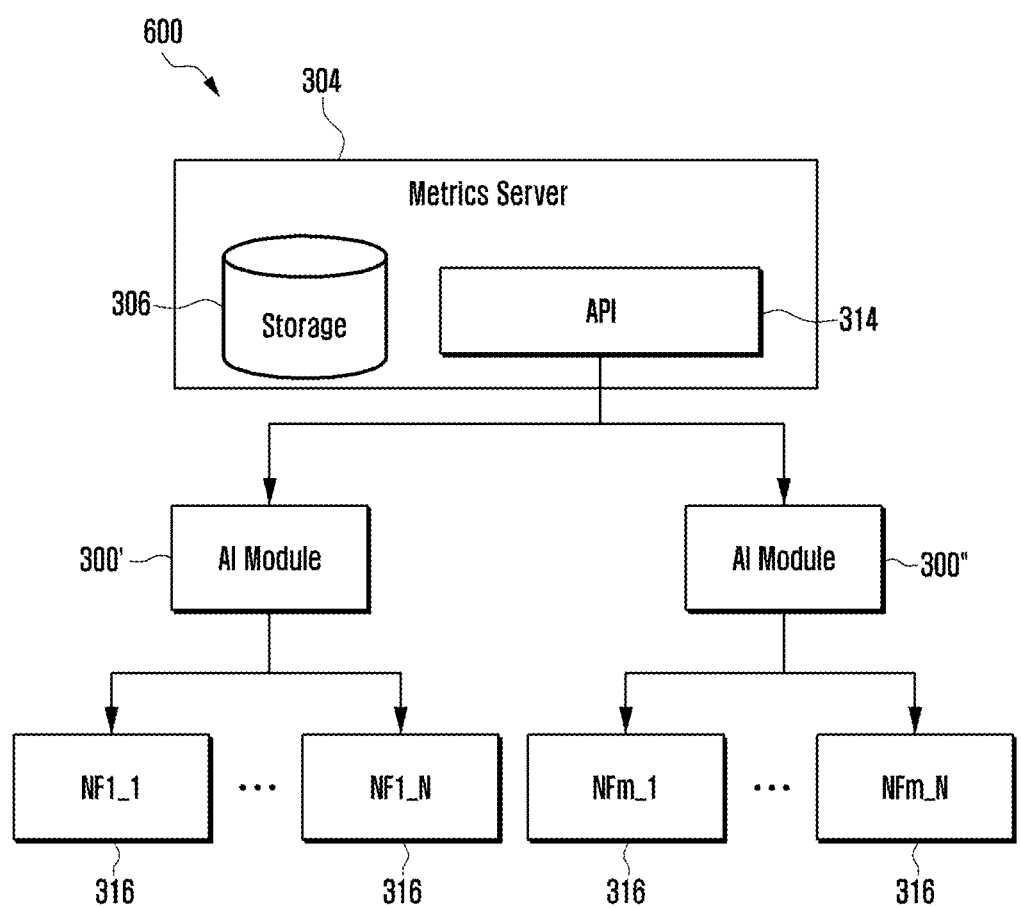
FIG. 6 is a schematic diagram showing how dedicated AI modules may perform autoscaling for specific sets of containers.

A network may comprise multiple sets of containers. FIG. 6 is a schematic diagram showing how dedicated AI modules may perform autoscaling for specific sets of containers.

In the existing technology, every container/NF has its own respective metric server. For example, if a container needs to be autoscaled, a HPA needs to: 1) obtain a metric used to make an autoscaling decision from the container; 2) compare the obtained metric with a threshold; and 3) make an autoscaling decision depending on whether the metric is above or below the threshold (as described with respect to FIGS. 1 and 2).

When autoscaling is applied to cloud services, the evaluation metrics are largely the same, e.g., CPU utilization, memory utilization, without the need to consider network contexts. When autoscaling is applied to a cloud native 5G network, there are mobile network contexts that need to be considered, and each NF has its particular network tasks to handle, therefore the metrics for different NFs may be very different. As a result, an existing autoscaling function may need to deploy different metric servers for each NF (e.g., CPU utilization for NF1, Memory utilization for NF2, etc.). Data/metrics collected for autoscaling of one NF, may not be reused for another NF.

The present disclosure are advantageous because, as shown in FIG. 6, a dedicated AI module may be provided for a set of containers. Here, data is collected in a single autoscaling metric server/data repository 304 for all containers/NFs 316 and different metrics are stored in one or multiple data repositories 306 in the metric server 304. Different service requests determine what data each AI module 300 needs to request from the data repository 306. The data repository 306 or metric server 304 exposes the requested data to the requesting AI module 300, via an API 314 (or a different API for each set of containers). One or multiple AI modules make decision for autoscaling of different NFs. As shown, an AI module 300' may make decisions for a set of containers NF1_1 to NF1_N (i.e. a first container NF1_1 and N replicas of that first container), while an AI module 300" may make decisions for a set of containers NFm_1 to NFm_N (where NFm means the mth NF). It will be understood that a single system may comprise 1 to m NFs/containers, and each set of NFs/containers may contain any number (N) replicas of an NF.

Thus, the step of receiving at least one metric from a metrics server regarding at least one set of containers may comprise: receiving at least one metric for each container of a first set of containers NF1_1 to NF1_N; and receiving at least one metric for each container of a second set of containers NFm_1 to NFm_N. In other words, the metrics server may provide metrics for multiple sets of containers.

In this example, the processing step may comprise: processing the received at least one metric for the first set of containers and the second set of containers using the ML model to make a first autoscaling decision with respect to the first set of containers, and a second autoscaling decision with respect to the second set of containers.

Figure 7:
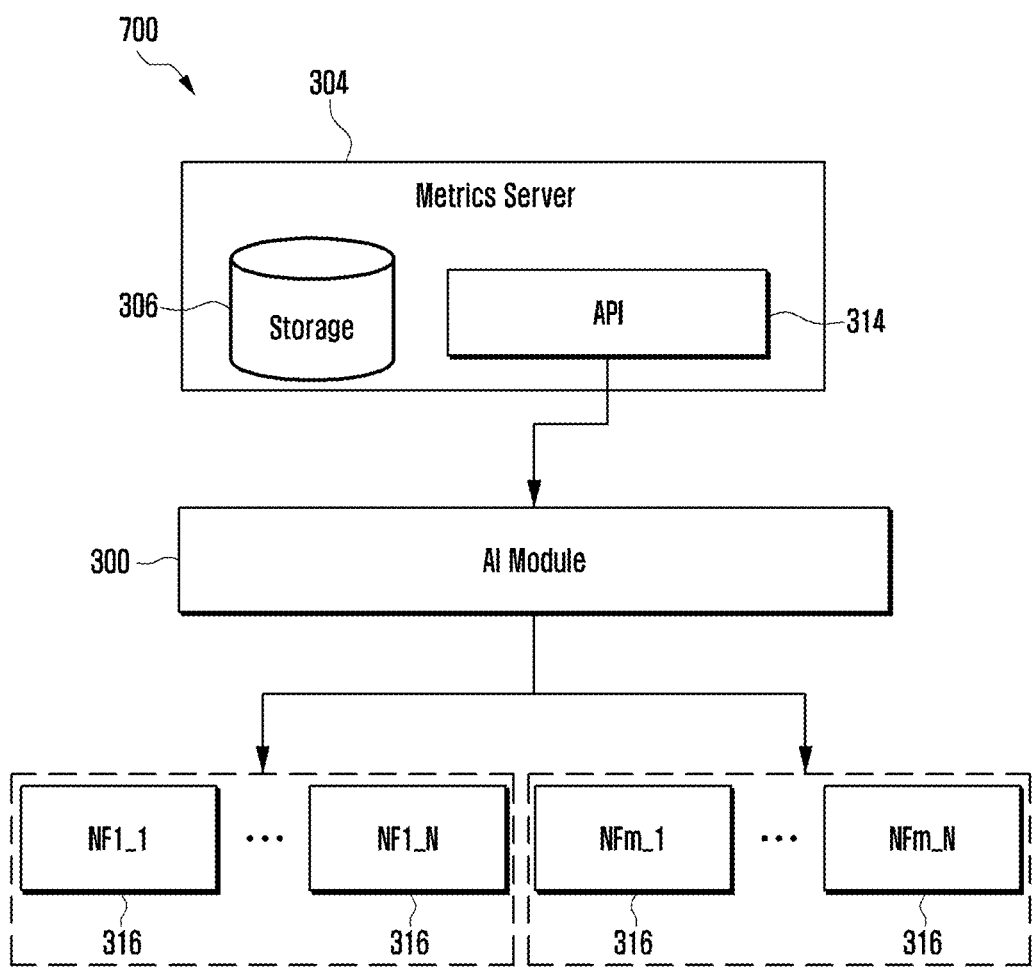
FIG. 7 is a schematic diagram showing how a single AI module may perform autoscaling for sets of containers.

FIG. 7 is a schematic diagram showing how a single AI module may perform autoscaling for sets of containers. Here, an AI module 300 may be centralised and can make decisions for multiple NFs (simultaneously or separately). It is noted in this case, there may be one or multiple metric server APIs for the same AI module.

Thus, multiple ML models may be used to make decisions with respect to multiple sets of containers. That is, each set of containers may be autoscaled by a dedicated ML model. In this example, the processing step may comprise: processing the received at least one metric for the first set of containers using a first ML model to make a first autoscaling decision with respect to the first set of containers, and processing the received at least one metric for the second set of containers using a second ML model to make a second autoscaling decision with respect to the second set of containers. Alternatively, a single ML model may be used to process metrics for multiple sets of containers.

It is noted that in both FIGS. 6 and 7, the AI module(s) may request different metrics from the metric server (and data repository) dynamically according to the service provided. Such data/metrics can vary according to different services, and different network functions (as containers) to autoscale. Furthermore, the AI module(s) may request different data for the same service and the same container to autoscale, but at different time instances when the AI module discovers that new data is needed.

Figure 8A:
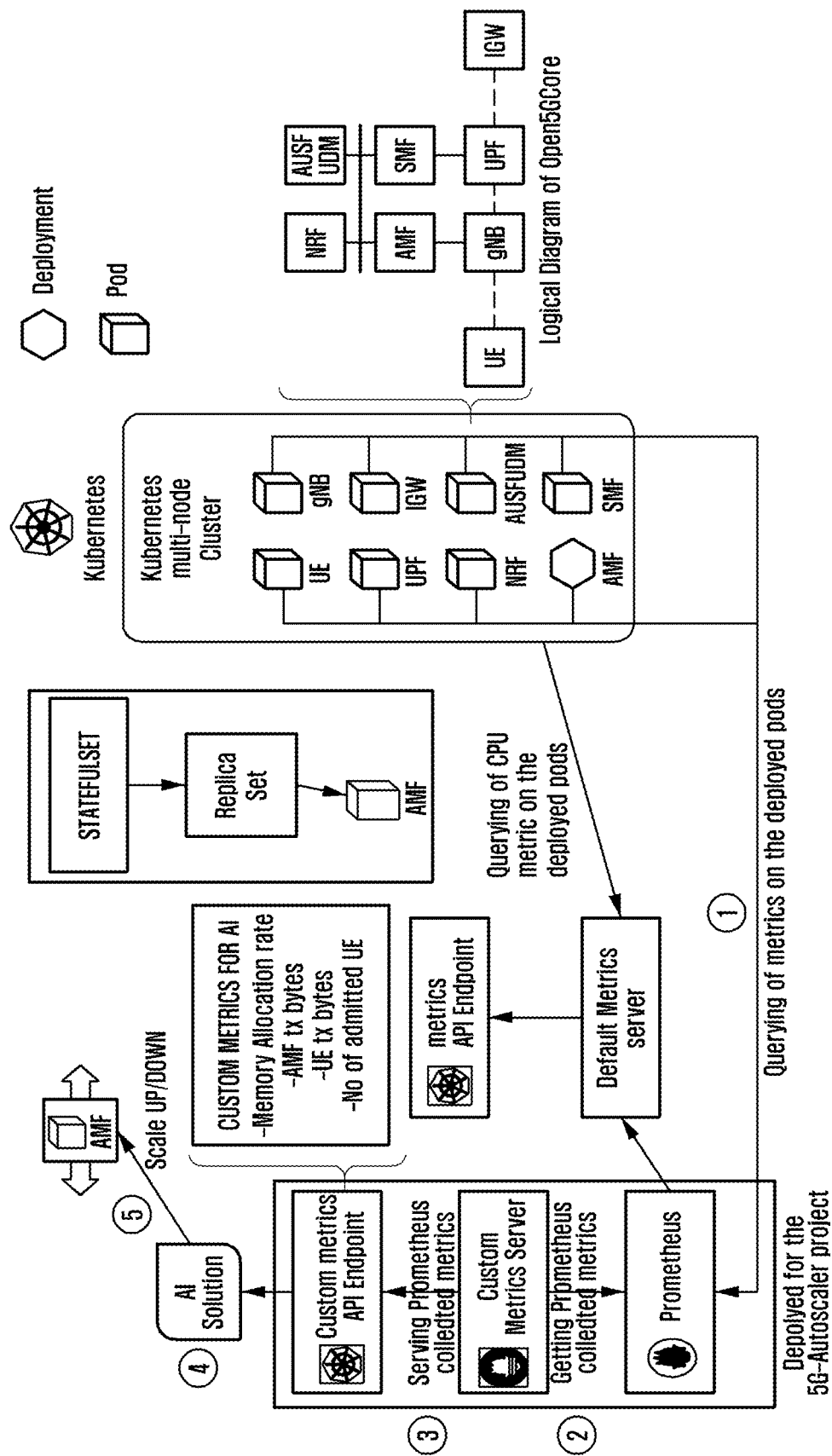
FIG. 8A is a schematic diagram showing how the present disclosure may be used to perform autoscaling in a 5G network.
Figure 8B:
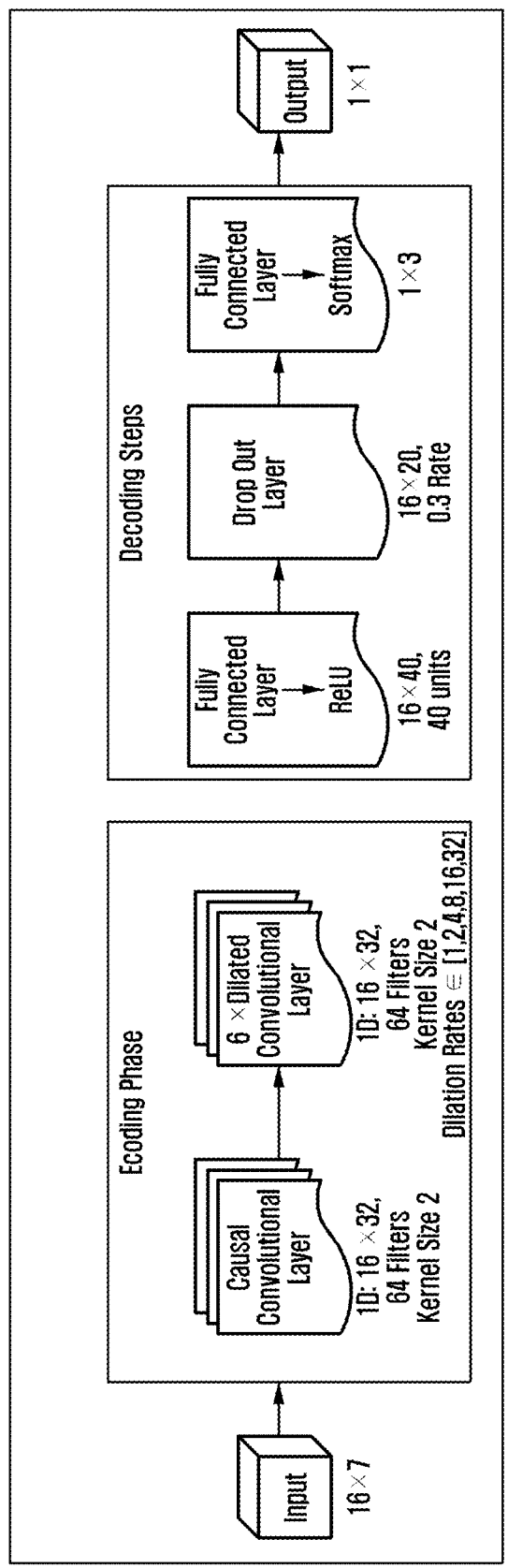
FIG. 8B is a schematic diagram of an architecture of an AI module used to perform autoscaling.

FIG. 8A is a schematic diagram showing how the present disclosure may be used to perform autoscaling in a 5G network. Here, the at least one set of containers may perform a 5G Core Access and Mobility Management Function, AMF. AMFs are used to perform session management within a 5G network architecture. In this example, the ML model may be making an autoscaling decision with respect to the AMFs. The step of processing the received at least one metric to make an autoscaling decision may comprise determining whether the number of AMF containers currently deployed is sufficient for handling the number of incoming user equipment, UE, requests.

Thus, in some cases, metrics on traffic from AMF to UE may be requested in order for AMF scaling for UE attachment (control plane). In other cases, for the same AMF scaling but on focusing on data plane, metrics on traffic between AMF and UPF may be requested. The AI module may also decide to collect and correlate multiple metrics to autoscale multiple NFs simultaneously.

The present disclosure may be used in a 5G network for a specific scenario, such as AMF autoscaling for UE admission. Here, the new customized metrics for use by the AI module may be: 1) memory allocation rate of AMF; 2) AMF to UE traffic; 3) UE to AMF traffic; 4) Number of admitted UE. Note all these metrics are new metrics for cloud native 5G core network, compared to existing autoscaling functions in cloud services.

FIG. 8A illustrates a platform that supports AI-based autoscaling for AMF. An API was used to integrate the AI module with the Open 5G core installation, which returns time series containing the following seven features, to be used as an input for the AI algorithms:
a) The number of incoming UE requests;
b) The number of AMF instances deployed;
c) Rate of the memory allocation for the AMF pod, for the functions of setting up the registration and admission of each new UE of the system, measured in bytes/time;
d) Control plane traffic rate as received from the AMF and transmitted by the UEs (UE to AMF path), measured in bytes/time; and
e) Control plane traffic rate as received from the UEs and transmitted by the AMF (AMF to UE path), measured in bytes/time.

In the example of FIG. 8A, the step of receiving the at least one metric may comprise receiving: a number of incoming user equipment, UE, requests; a number of AMF containers currently deployed; a rate of memory allocation for each AMF container with respect to registering and admitting each UE to the network; traffic rate information for data received by each AMF container from each UE; and traffic rate information for data transmitted by each AMF container to each UE. Thus, the step of processing the received at least one metric to make an autoscaling decision may comprise determining whether the number of AMF containers currently deployed is sufficient for handling the number of incoming UE requests.

Figure 8C:
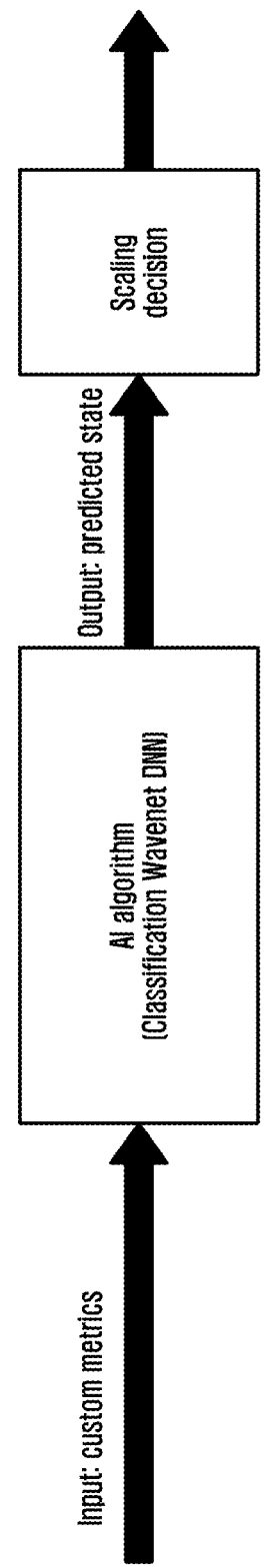
FIG. 8C illustrates how a machine learning, ML, model is used to make an autoscaling decision.

FIG. 8C illustrates how a machine learning, ML, model is used to make an autoscaling decision. As mentioned above, the ML model receives a set of custom metrics for a particular network in which containers are performing a particular function, and the model predicts a future state of the at least one set of containers using the received metrics. The predicted future state is then used to make an autoscaling decision with respect to the set of containers, wherein the autoscaling decision is one of: do nothing, scale-up, and scale-down. Advantageously, this means that the ML model is predicting what a future state of the network may be based on the current metrics, and this enables an autoscaling decision to be made before any future problems arise. While conventional autoscalers check network traffic periodically and hence can only act after issues in the network have already appeared, the ML model of the present disclosure proactively predicts a network state and makes a decision before the containers need to be scaled.

The present disclosure have been experimentally tested. Specifically, the present disclosure have been applied to a cloud native 5G network, and the above designed custom metrics for the above specific service (UE admission) are fed to an AI module and tested. The results have been compared to the results obtained using the existing default Horizontal Pod Autoscaler (HPA).

Figure 9:
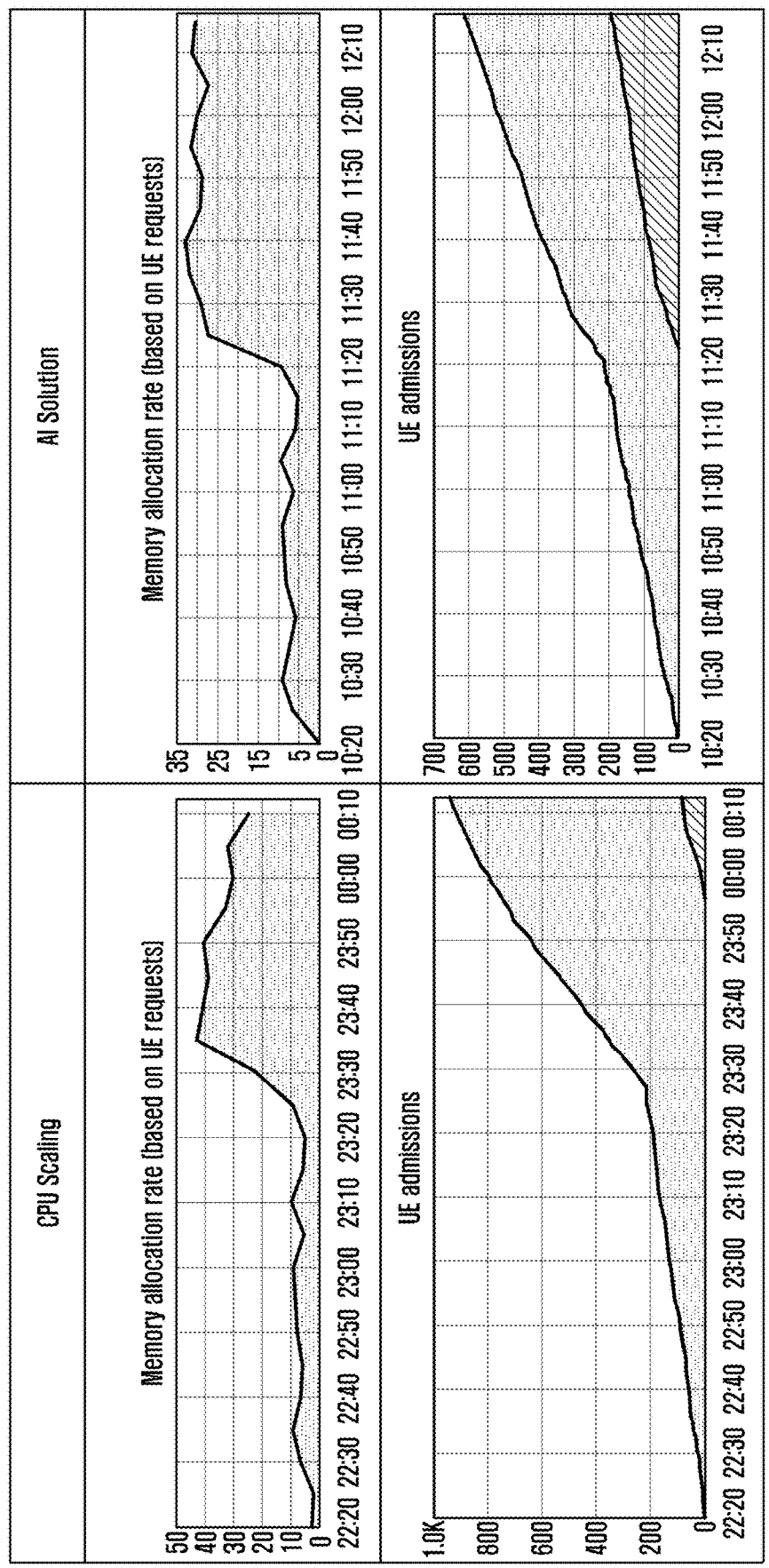
FIG. 9 shows results of an experiment comparing times for HPA-based autoscaling and AI-based autoscaling.

FIG. 9 shows results of an experiment comparing times for HPA-based autoscaling and AI-based autoscaling. It has been demonstrated that with AI-based autoscaling, especially using historical traffic (from UE to AMF, and AMF to UE) to predict the traffic increase, AI-based autoscaling can spawn new replica containers almost instantly as the traffic increases, while it takes about 10 minutes for the existing HPA techniques to respond to a traffic increase. Thus, the present disclosure provide fast, low latency autoscaling.

Figure 10:
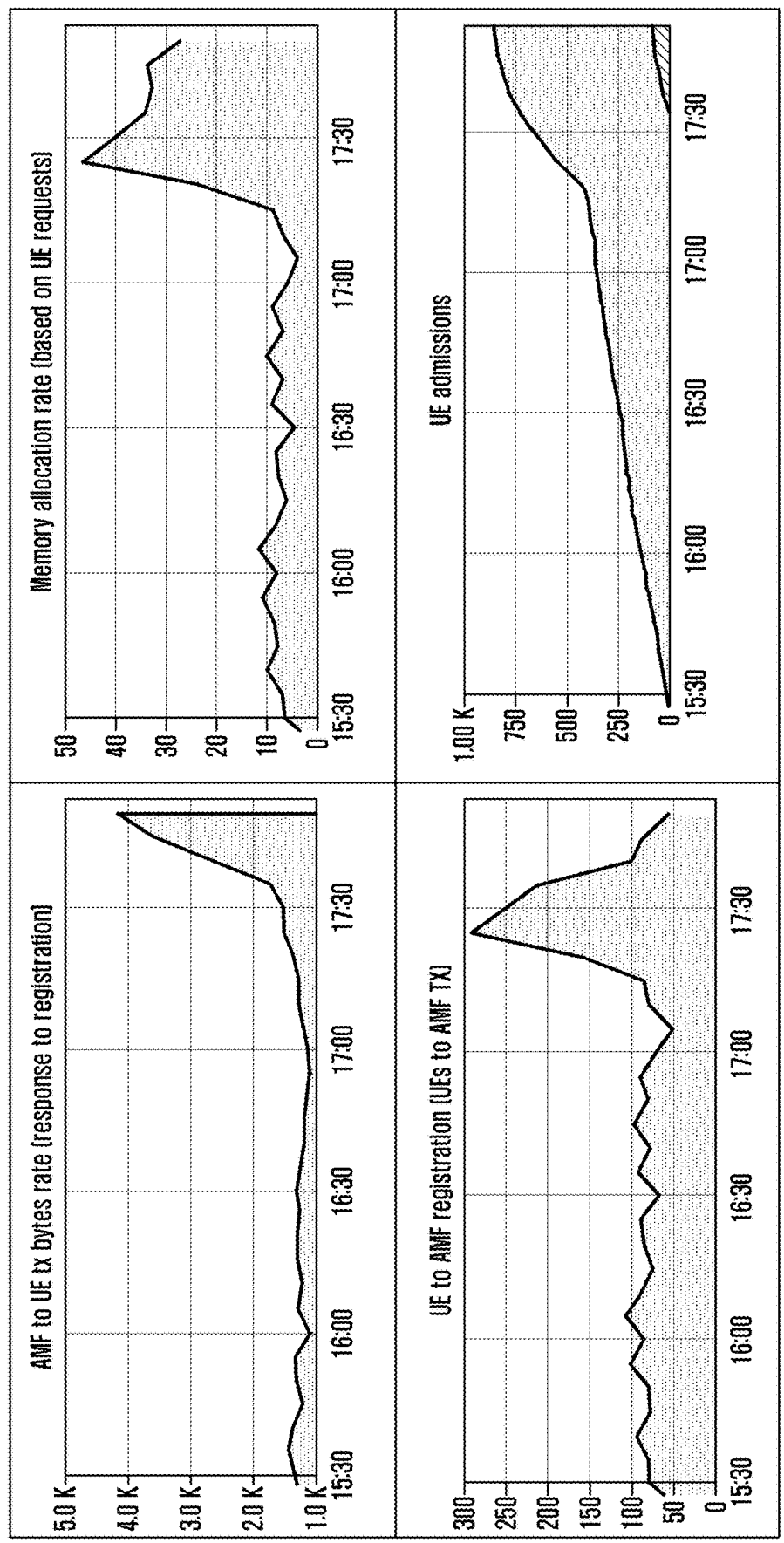
FIG. 10 shows results of an experiment using AI-based autoscaling to scale-up a set of containers.
Figure 11:
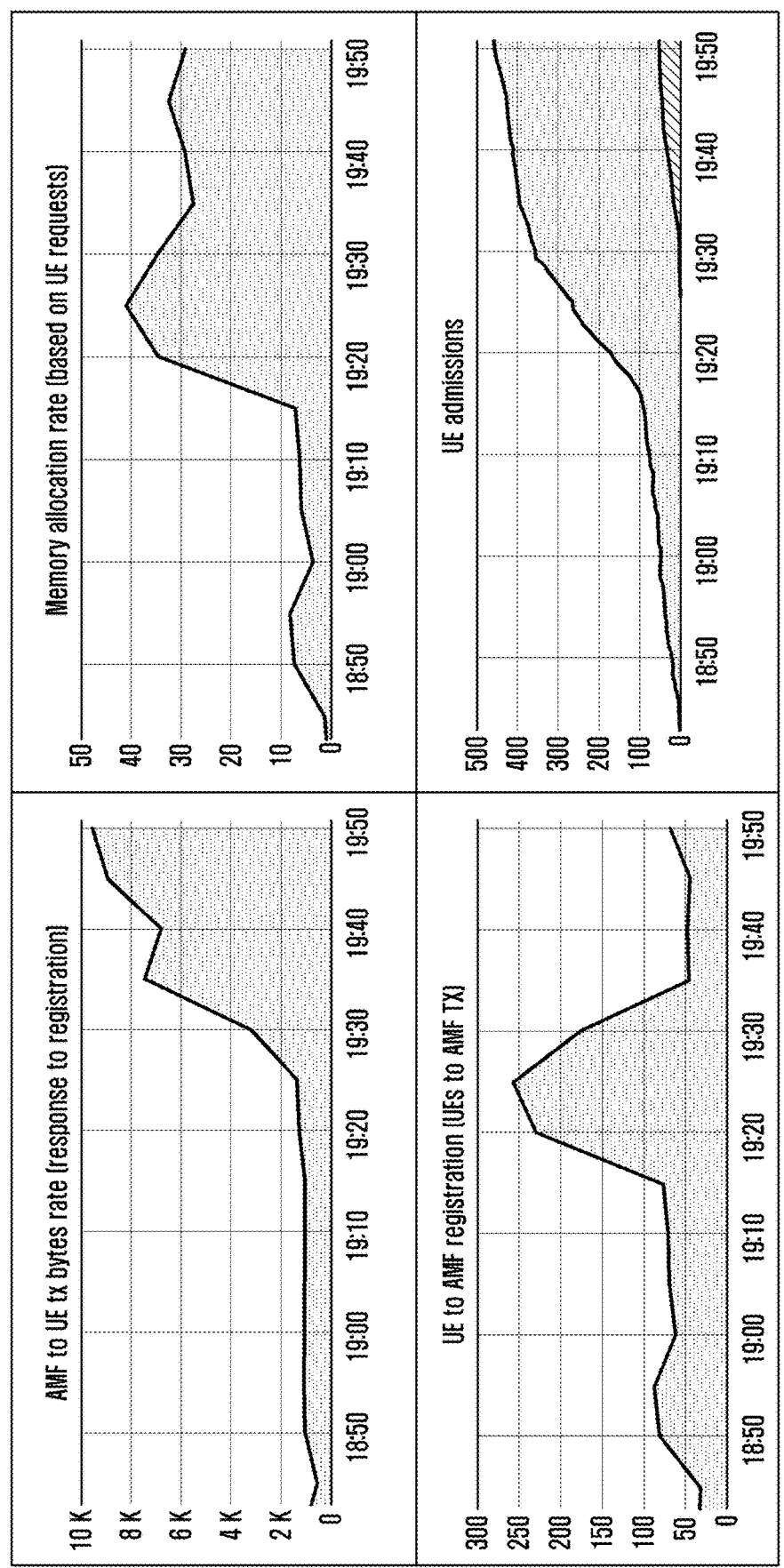
FIG. 11 shows results of an experiment using HPA-based autoscaling to scale-up a set of containers.

FIG. 10 shows results of an experiment using AI-based autoscaling (i.e. the present disclosure) to scale-up a set of containers, and FIG. 11 shows results of an experiment using HPA-based autoscaling to scale-up a set of containers. It can be seen that the AI-based autoscaling techniques caused an AMF container to scale four times due to the increased demands on the AMF's memory allocation rate as more requests from UEs were received. In contrast, in the same scenario, the Kubernetes HPA decided to scale up the AMF container more than 10 times, i.e. it generated six more containers than required to perform the UE registration function. (A restriction on the maximum number of containers was defined as 10 at the start of the experiment, so while the HPA scaled more than 10 times, this was restricted to 10). For the case of CPU (existing) scaling, the large number of AMFs that are spawned makes the system highly unstable, resulting to some losses when under high load. This is better than not using scaling at all, however several UEs might be denied access. CPU scaling results in a large number of idle replicas in the system, and thus lower utilization of each AMF over time. Contrary to this, the AI solution results in a highly stable system, as only the number of replicas that are needed are spawned, resulting to always admitting all the UEs in the system, for the under-test dataset. Time scaling based triggering of AMF replicas (up to 4 in our experiments) results in no UE denials in the system, and significantly higher load per each AMF.

Thus, the present disclosure: allow network contexts collection/storage/exchange/extraction in a cloud native 5G network, and in real time that facilitates AI-enabled orchestration of network function (as containers); allow proactive autoscaling while existing autoscaler does it reactively (e.g., by fetching measured metrics every 5 minutes); provide apparatus, APIs and procedures that are needed to generate optimal customised metrics for one or multiple AI modules, while existing HPA metrics are not optimal, and do not allow real-time collection and extraction of network data to generate the HPA metrics, and does not allow the use of the information in historical network context data; enable optimize customer metrics according to specific mobile services; and enabled AI-based autoscaling in 5G networks, for proactive autoscaling in mobile services/applications, for one or multiple network functions (as containers).

Some benefits of the present disclosure when used in a cloud native 5G network include a reduced latency on autoscaling, enhanced network efficiency, and real-time network contexts extraction and collection, that are intrinsic when applying existing cloud based orchestration methods to a cloud native 5G network.

Those skilled in the art will appreciate that while the foregoing has described what is considered to be the best mode and where appropriate other modes of performing present disclosure, the present disclosure should not be limited to the specific configurations and methods disclosed in this description of the preferred embodiment. Those skilled in the art will recognise that present disclosure have a broad range of applications, and that the embodiments may take a wide range of modifications without departing from any inventive concept as defined in the appended claims.

The invention claimed is:

1. A method performed by a device comprising an artificial intelligence (AI) module for autoscaling containers of a cloud-native core network with containerised network functions, the method comprising:
  requesting, from at least one metrics server, at least one metric required to make an autoscaling decision with respect to at least one set of containers which performs an access and mobility management function (AMF) in a $5^{th}$ generation (5G) core network, wherein the autoscaling decision comprises determining whether to scale-up or scale-down a number of containers;
  receiving the at least one metric from the at least one metrics server, the at least one metric including a number of incoming user equipment (UE) requests, a number of AMF containers currently deployed, a rate of memory allocation for each AMF container with respect to registering and admitting each UE to the network, and a time cumulative moving average of the rate of memory allocation for each AMF container;

performing the autoscaling decision, using a trained machine learning (ML) model, based on the received at least one metric; and scaling-up or scaling-down the number of containers, based on a result of the autoscaling decision.

2. The method of claim 1, further comprising:

obtaining a set of metrics required to make the autoscaling decision with respect to the at least one set of containers, based on a particular network function performed by the set of containers, wherein requesting the at least one metric comprises requesting at least one metric selected from the set of metrics.

3. The method of claim 2, wherein each metric in the set of metrics is weighted depending on an importance of the metric to making the autoscaling decision for the set of containers that perform the particular network function, wherein the set of metrics required to make the autoscaling decision depends on the particular network function performed by the set of containers and operational requirements of the network, and wherein the operational requirements comprise at least one of: a latency requirement, a quality of service requirement.

4. The method of claim 1, wherein performing the autoscaling decision comprises:

predicting, using the trained ML model, a future state of the at least one set of containers; and using the predicted state to make an autoscaling decision with respect to the set of containers, wherein the autoscaling decision is one of: do nothing, scale-up, and scale-down, and wherein receiving the at least one metric from the metrics server comprises receiving a historical metric from storage or a real-time metric from the set of containers via the metrics server.

5. The method of claim 1, wherein the at least one metric is requested at time intervals, wherein the time intervals depend on operational requirements of the network, and wherein receiving the at least one metric from the metrics server comprises receiving, for the set of containers, at least one of: processor utilisation for each container in the set, memory utilisation for each container in the set, and at least one task performed by the set of containers.

6. The method of claim 1, wherein receiving the at least one metric from the metrics server comprises:

receiving at least one metric for each container of a first set of containers; and receiving at least one metric for each container of a second set of containers.

7. The method of claim 1, wherein performing the autoscaling decision comprises determining whether the number of AMF containers currently deployed is sufficient for handling the number of incoming UE requests.

8. A device comprising an artificial intelligence (AI) module for autoscaling containers of a cloud-native core network with containerised network functions, the device comprising the AI module comprising:

a memory; and a processor coupled with the memory and configured to:

request, from at least one metrics server, at least one metric required to make an autoscaling decision with respect to at least one set of containers which performs an access and mobility management function (AMF) in a $5^{th}$ generation (5G) core network, wherein the autoscaling decision comprises determining whether to scale-up or scale-down a number of containers, receive the at least one metric from the at least one metrics server, the at least one metric including a number of incoming user equipment (UE) requests, a number of AMF containers currently deployed, a rate of memory allocation for each AMF container with respect to registering and admitting each UE to the network, and a time cumulative moving average of the rate of memory allocation for each AMF container, perform the autoscaling decision, using a trained machine learning (ML) model, based on the received at least one metric, and scale-up or scale-down the number of containers, based on a result of the autoscaling decision.

9. The device comprising the AI module of claim 8, wherein the processor is further configured to obtain a set of metrics required to make the autoscaling decision with respect to the at least one set of containers, based on a particular network function performed by the set of containers, wherein, to request the at least one metric, the processor is further configured to request at least one metric selected from the set of metrics.

10. The device comprising the AI module of claim 9, wherein each metric in the set of metrics is weighted depending on an importance of the metric to making the autoscaling decision for the set of containers that perform the particular network function, wherein the set of metrics required to make the autoscaling decision depends on the particular network function performed by the set of containers and operational requirements of the network, and wherein the operational requirements comprise at least one of: a latency requirement, a quality of service requirement.

11. The device comprising the AI module of claim 8, wherein, to perform the autoscaling decision, the processor is further configured to:

predict, using the trained ML model, a future state of the at least one set of containers, and use the predicted state to make an autoscaling decision with respect to the set of containers, wherein the autoscaling decision is one of: do nothing, scale-up, and scale-down, and wherein, to receive the at least one metric from the metrics server, the processor is further configured to receive a historical metric from storage or a real-time metric from the set of containers via the metrics server.

12. The device comprising the AI module of claim 8, wherein the at least one metric is requested at time intervals, wherein the time intervals depend on operational requirements of the network.

13. The device comprising the AI module of claim 8, wherein, to receive the at least one metric from the metrics server, the processor is further configured to receive, for the set of containers, at least one of: processor utilisation for each container in the set, memory utilisation for each container in the set, and at least one task performed by the set of containers.

14. The device comprising the AI module of claim 8, wherein, to receive the at least one metric from the metrics server, the processor is further configured to:
- receive at least one metric for each container of a first set of containers, and
- receive at least one metric for each container of a second set of containers.

15. The device comprising the AI module of claim 8, wherein, to perform the autoscaling decision, the processor is further configured to determine whether the number of AMF containers currently deployed is sufficient for handling the number of incoming UE requests.

* * * * *